(12) United States Patent  (10) Patent No.: US 8,947,016 B2
Melanson et al.  (45) Date of Patent: Feb. 3, 2015

(54) TRANSFORMER-ISOLATED LED LIGHTING CIRCUIT WITH SECONDARY-SIDE DIMMING CONTROL

(75) Inventors: John L. Melanson, Austin, TX (US); Eric King, Dripping Springs, TX (US)

(73) Assignee: Cirrus Logic, Inc., Austin, TX (US)

( * ) Notice: Subject to any disclaimer, the term of this patent is extended or adjusted under 35 U.S.C. 154(b) by 188 days.

(21) Appl. No.: 13/537,301

(22) Filed: Jun. 29, 2012

(65) Prior Publication Data

US 2013/0002156 A1    Jan. 3, 2013

Related U.S. Application Data

(63) Continuation-in-part of application No. 13/287,257, filed on Nov. 2, 2011, and a continuation-in-part of application No. 13/194,531, filed on Jul. 29, 2011.

(60) Provisional application No. 61/503,369, filed on Jun. 30, 2011, provisional application No. 61/369,202, filed on Jul. 30, 2010.

(51) Int. Cl.
*H05B 37/02* (2006.01)
*H05B 33/08* (2006.01)

(52) U.S. Cl.
CPC ........ *H05B 33/0815* (2013.01); *H05B 33/0845* (2013.01); *Y02B 20/347* (2013.01); *Y02B 20/345* (2013.01)
USPC ............................ 315/307; 315/186; 315/297

(58) Field of Classification Search
USPC ............. 315/185 R, 186, 192, 291, 294, 297, 315/299, 307, 308, 312
See application file for complete search history.

(56) References Cited

U.S. PATENT DOCUMENTS

| 4,523,128 | A | 6/1985 | Stamm et al. |
| 5,055,746 | A | 10/1991 | Hu et al. |
| 5,319,301 | A | 6/1994 | Callahan et al. |
| 5,321,350 | A | 6/1994 | Haas |
| 5,430,635 | A | 7/1995 | Liu |

(Continued)

FOREIGN PATENT DOCUMENTS

| EP | 1164819 | 12/2001 |
| EP | 2257124 A1 | 1/2010 |

(Continued)

OTHER PUBLICATIONS

Adrian Z Amanci, et al. "Synchronization System with Zero-Crossing Peak Detection Algorithm for Power System Applications." 2010 IPEC Conference. Jun. 2010. pp. 2884-2991. Publisher: IEEE. Piscataway, NJ, USA.

(Continued)

*Primary Examiner* — Tung X Le
(74) *Attorney, Agent, or Firm* — Mitch Harris, Atty at Law, LLC; Andrew M. Harris

(57) ABSTRACT

A transformer isolated LED lighting circuit supplies current from a secondary-side storage capacitor to one or more LED strings in conformity with one or more dimming values. The dimming values are communicated through the transformer by patterns or codes provided in pulses of a power converter circuit that charges the storage capacitor from the primary side of the transformer, or alternatively by a special modulated signal provided in addition to the switching pulses.

31 Claims, 5 Drawing Sheets

(56) References Cited

U.S. PATENT DOCUMENTS

| | | | |
|---|---|---|---|
| 5,691,605 A | 11/1997 | Xia et al. | |
| 5,770,928 A | 6/1998 | Chansky et al. | |
| 6,043,635 A | 3/2000 | Downey | |
| 6,046,550 A | 4/2000 | Ference et al. | |
| 6,091,205 A | 7/2000 | Newman, Jr. et al. | |
| 6,211,624 B1 | 4/2001 | Holzer | |
| 6,380,692 B1 | 4/2002 | Newman, Jr. et al. | |
| 6,407,514 B1 | 6/2002 | Glaser et al. | |
| 6,621,256 B2 | 9/2003 | Muratov et al. | |
| 6,713,974 B2 | 3/2004 | Patcharnik et al. | |
| 6,858,995 B2 | 2/2005 | Lee et al. | |
| 6,900,599 B2 | 5/2005 | Ribarich | |
| 7,102,902 B1 | 9/2006 | Brown et al. | |
| 7,180,250 B1 | 2/2007 | Gannon | |
| 7,184,937 B1 | 2/2007 | Su et al. | |
| 7,288,902 B1 | 10/2007 | Melanson | |
| 7,656,103 B2 | 2/2010 | Shteynberg et al. | |
| 7,719,246 B2 | 5/2010 | Melanson | |
| 7,733,678 B1 | 6/2010 | Notohamiprodjo et al. | |
| 7,759,881 B1 | 7/2010 | Melanson | |
| 7,786,711 B2 | 8/2010 | Wei et al. | |
| 7,872,427 B2 | 1/2011 | Scianna | |
| 8,102,167 B2 | 1/2012 | Irissou et al. | |
| 8,115,419 B2 | 2/2012 | Given et al. | |
| 8,169,154 B2 | 5/2012 | Thompson et al. | |
| 8,212,491 B2 | 7/2012 | Kost et al. | |
| 8,212,492 B2 | 7/2012 | Lam et al. | |
| 8,222,832 B2 | 7/2012 | Zheng et al. | |
| 8,569,972 B2 | 10/2013 | Melanson | |
| 8,749,173 B1 | 6/2014 | Melanson et al. | |
| 8,796,940 B2 * | 8/2014 | Altonen et al. | 315/209 R |
| 2004/0105283 A1 | 6/2004 | Schie et al. | |
| 2004/0212321 A1 | 10/2004 | Lys et al. | |
| 2006/0022648 A1 | 2/2006 | Ben-Yaakov et al. | |
| 2006/0208669 A1 | 9/2006 | Huynh et al. | |
| 2007/0182338 A1 | 8/2007 | Shteynberg et al. | |
| 2007/0182347 A1 | 8/2007 | Shteynberg | |
| 2008/0018261 A1 | 1/2008 | Kastner | |
| 2008/0143266 A1 | 6/2008 | Langer | |
| 2008/0192509 A1 * | 8/2008 | Dhuyvetter et al. | 363/17 |
| 2008/0205103 A1 | 8/2008 | Sutardja et al. | |
| 2008/0224629 A1 | 9/2008 | Melanson | |
| 2008/0224633 A1 | 9/2008 | Melanson | |
| 2008/0224636 A1 | 9/2008 | Melanson | |
| 2009/0134817 A1 * | 5/2009 | Jurngwirth et al. | 315/307 |
| 2009/0195186 A1 | 8/2009 | Guest et al. | |
| 2009/0284182 A1 | 11/2009 | Cencur | |
| 2010/0002480 A1 | 1/2010 | Huynh et al. | |
| 2010/0013405 A1 | 1/2010 | Thompson et al. | |
| 2010/0013409 A1 | 1/2010 | Quek et al. | |
| 2010/0066328 A1 | 3/2010 | Shimizu et al. | |
| 2010/0164406 A1 | 7/2010 | Kost et al. | |
| 2010/0213859 A1 | 8/2010 | Shteynberg et al. | |
| 2010/0231136 A1 | 9/2010 | Reisenauer et al. | |
| 2010/0244726 A1 | 9/2010 | Melanson | |
| 2011/0043133 A1 | 2/2011 | Van Laanen et al. | |
| 2011/0080110 A1 | 4/2011 | Nuhfer et al. | |
| 2011/0084622 A1 | 4/2011 | Barrow et al. | |
| 2011/0084623 A1 | 4/2011 | Barrow | |
| 2011/0115395 A1 | 5/2011 | Barrow et al. | |
| 2011/0121754 A1 | 5/2011 | Shteynberg | |
| 2011/0148318 A1 * | 6/2011 | Shackle et al. | 315/291 |
| 2011/0204797 A1 | 8/2011 | Lin et al. | |
| 2011/0204803 A1 | 8/2011 | Grotkowski et al. | |
| 2011/0234115 A1 | 9/2011 | Shimizu et al. | |
| 2011/0266968 A1 | 11/2011 | Bordin et al. | |
| 2011/0291583 A1 | 12/2011 | Shen | |
| 2011/0309759 A1 | 12/2011 | Shteynberg et al. | |
| 2012/0025729 A1 | 2/2012 | Melanson et al. | |
| 2012/0049752 A1 | 3/2012 | King et al. | |
| 2012/0068626 A1 | 3/2012 | Lekatsas et al. | |
| 2012/0112651 A1 | 5/2012 | King et al. | |
| 2012/0286686 A1 | 11/2012 | Watanabe et al. | |
| 2013/0154495 A1 | 6/2013 | He | |

FOREIGN PATENT DOCUMENTS

| | | |
|---|---|---|
| EP | 2232949 | 9/2010 |
| JP | 2008053181 A | 3/2008 |
| JP | 2009170240 A | 7/2009 |
| WO | WO 02/096162 A1 | 11/2002 |
| WO | WO 2006/079937 A1 | 8/2006 |
| WO | 2008029108 | 3/2008 |
| WO | 2010011971 A1 | 1/2010 |
| WO | WO 2010027493 A2 | 3/2010 |
| WO | WO 2010035155 A2 | 4/2010 |
| WO | WO 2011008635 A1 | 1/2011 |
| WO | WO 2011/050453 A1 | 5/2011 |
| WO | WO 2011/056068 A2 | 5/2011 |
| WO | WO 2012/016197 A1 | 2/2012 |

OTHER PUBLICATIONS

Engdahl, Tomi, Light Dimmer Circuits, 1997-2000, 9 pages (pp. 1-9 in pdf), dowloaded from www.epanorama.net.

"Why Different Dimming Ranges?", 2003, 1 page, downloaded from http://www.lutron.com/TechnicalDocumentLibrary/LutronBallastpg3.pdf.

Azoteq, IQS17 Family, IQ Switch—ProxSense Series, Touch Sensor, Load Control and User Interface, IQS17 Datasheet V2.00.doc, Jan. 2007, pp. 1-51, Azoteq (Pty) Ltd., Paarl, Western Cape, Republic of South Africa.

Chan, Samuel, et al, Design and Implementation of Dimmable Electronic Ballast Based on Integrated Inductor, IEEE Transactions on Power Electronics, vol. 22, No. 1, Jan. 2007, pp. 291-300, Dept. of Electron. Eng., City Univ. of Hong Kong.

Rand, Dustin, et al, Issues, Models and Solutions for Triac Modulated Phase Dimming of LED Lamps, Power Electronics Specialists Conference, 2007. PESC 2007. IEEE, Jun. 17-21, 2007, pp. 1398-1404, Boston, MA, USA.

Gonthier, Laurent, et al, EN55015 Compliant 500W Dimmer with Low-Losses Symmetrical Switches, ST Microelectronics, Power Electronics and Applications, 2005 European Conference, pp. 1-9, Aug. 7, 2006, Dresden.

Green, Peter, A Ballast That Can Be Dimmed from a Domestic (Phase Cut) Dimmer, International Rectifier, IRPLCFL3 rev.b, pp. 1-12, Aug. 15, 2003, El Segundo, California, USA.

Hausman, Don, Real-Time Illumination Stability Systems for Trailing-Edge (Reverse Phase Control) Dimmers, Lutron RTISS, Lutron Electronics Co, Dec. 2004, pp. 1-4, Coopersburg, PA, USA.

Lee, Stephen, et al, A Novel Electrode Power Profiler for Dimmable Ballasts Using DC Link Voltage and Switching Frequency Controls, IEEE Transactions on Power Electronics, vol. 19, No. 3, May 2004, pp. 847-833, City University of Hong Kong.

Engdahl, Tomi, Light Dimmer Circuits, 1997-2000, downloaded from www.epanorama.net.

O'Rourke, Conan, et al, Dimming Electronic Ballasts, National Lighting Product Information Program, Specifier Reports, vol. 7, No. 3, Oct. 1999, pp. 1-24, Troy, NY, USA.

Supertex Inc, 56W Off-line LED Driver, 120VAC with PFC, 160V, 350mA Load, Dimmer Switch Compatible, DN-H05, pp. 1-20, Jun. 17, 2008, Sunnyvale, California, USA.

"Why Different Dimming Ranges?", 2003, downloaded from http://www.lutron.com/TechnicalDocumentLibrary/LutronBallastpg3.pdf.

Wu, Tsai-Fu, et al, Single-Stage Electronic Ballast with Dimming Feature and Unity Power Factor, IEEE Transactions on Power Electronics, vol. 13, No. 3, May 1998, pp. 586-597.

Patterson, James. "Efficient Method for Interfacing Triac Dimmers and LEDs", EDN Network, Jun. 23, 2011, 4 pages (pp. 1-4 in pdf), National Semiductor Corp., UBM Tech.

Vainio, et al., "Digital Filtering for Robust 50/60 Hz Zero-Crossing Detectors", IEEE Transactions on Instrumentation and Measurement, Apr. 1996, vol. 45, No. 2, Piscataway, NJ, US.

* cited by examiner

TRANSFORMER-ISOLATED LED LIGHTING CIRCUIT WITH SECONDARY-SIDE DIMMING CONTROL

The present U.S. Patent Application claims priority under 35 U.S.C. §119(e) to U.S. Provisional Patent Application Ser. No. 61/503,369 filed on Jun. 30, 2011, priority under 35 U.S.C. §120 to U.S. patent application Ser. No. 13/287,257 filed on Nov. 2, 2011, and priority under 35 U.S.C. §120 to U.S. patent application Ser. No. 13/194,531 filed on Jul. 29, 2011, which claims priority under 35 U.S.C. §119(e) to U.S. Provisional Patent Application Ser. No. 61/369,202 filed on Jul. 30, 2010. The disclosures of the above-referenced U.S. Patent Applications are incorporated herein by reference.

BACKGROUND OF THE INVENTION

1. Field of the Invention

The present invention relates generally to dimmable light emitting diode (LED) lamps, and in particular to an LED lamp power source that controls dimming of the LEDs from the secondary side of a transformer.

2. Background of the Invention

Lighting control and power supply integrated circuits (ICs) are in common use in both electronic systems and in replaceable consumer lighting devices, e.g., light-emitting-diode (LED) and compact fluorescent lamp (CFL) replacements for traditional incandescent light bulbs.

The power conversion required for operating LED lamps efficiently is typically from a relatively high-voltage rectified AC line power supply (e.g., 120 VAC or 240 VAC rectified to 180 VDC or 360 VDC), to the forward voltage drop of one or more LEDs arranged in a series-connected "string", which is on the order of 5V-15V for the typical incandescent bulb replacement device. Since, without filtering, this rectified line voltage will vary at a slow rate (e.g., 120 Hz), energy must be stored to avoid varying the current supplied to the LEDs. Therefore, capacitors of sufficient storage must be provided to filter the rectified line voltage, and/or the rectified line voltage must be converted to a lower DC voltage to provide the proper operating voltage for the LEDs. Thus it is desirable to convert the rectified line voltage to a lower DC voltage using a transformer-coupled topology, such as a flyback converter.

However, by using a transformer-coupled topology, controlling the dimming level in dimmable LED lighting devices typically requires another isolated signal path, such as an optical isolator or signal transformer to permit communication of the dimming information (i.e., the shape of the AC line waveform that is provided from a thyristor-based dimmer) to the secondary side of the transformer, which raises the cost of the replacement lighting device, as well as complexity of the circuit.

Therefore, it would be desirable to provide a lower-cost transformer-isolated power source circuit that can supply LEDs without requiring a separate isolated signal path for controlling the brightness of one or more LED strings in conformity with a dimming level determined from the shape of the input AC line voltage.

SUMMARY OF THE INVENTION

The invention is embodied in a circuit for supplying power to multiple lighting devices, an IC including such a circuit and a method of operation of the circuit.

The circuit is an isolated circuit including a transformer having a primary winding coupled to a first power converter circuit that converts a rectified AC line voltage to a lower voltage, and a secondary winding coupled to a storage capacitor. The circuit further includes a second power converter circuit that supplies current to one or more LED strings from the storage capacitor in conformity with a dimming value. The dimming value is communicated through the transformer by patterns or codes provided in switching pulses of the first power converter circuit, or alternatively by a special modulated signal provided in addition to the switching pulses.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses circuits and methods for powering and controlling lighting diodes (LEDs), in which a transformer is used to isolate the LEDs from the input AC line and in which dimming information is conveyed through the transformer by encoding the dimming information either in the positions of switching pulses used to couple energy through the transformer, or by additional information coupled through the transformer.

Figure 1:
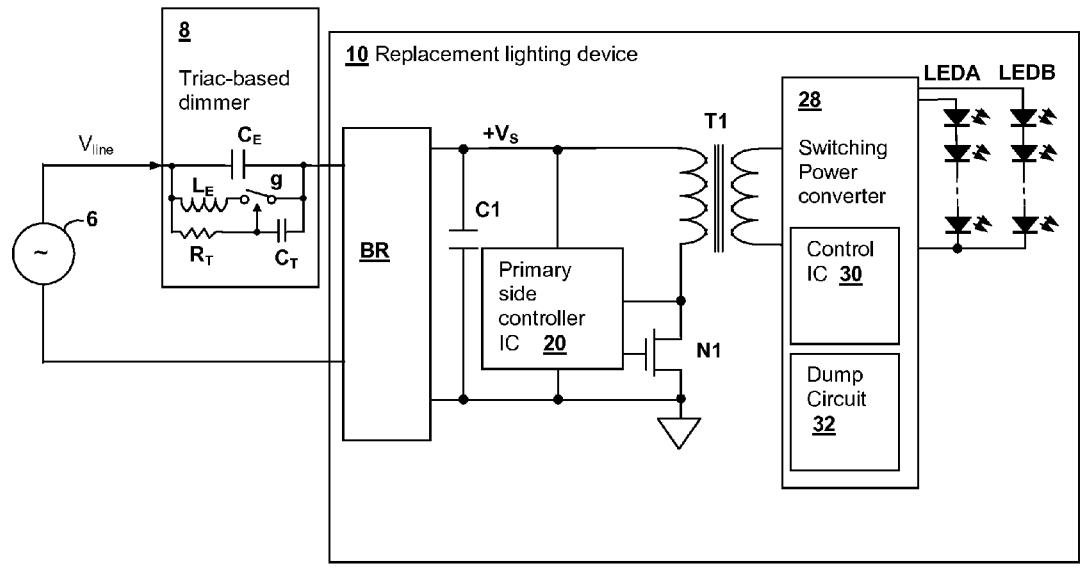
FIG. 1 is a block diagram depicting connections of a lighting device 10.

Referring now to FIG. 1, a replacement lighting device 10 is shown connected to an AC line voltage source 6 via a triac-based dimmer 8, such as is generally found in household lighting applications. Replacement lighting device 10 includes LED strings LEDA,LEDB that produce illumination in place of a typical incandescent bulb, providing longer life, less heat and less energy consumption than the equivalent incandescent bulb. A transformer T1, provides isolation between a primary-side circuit coupled to triac-based dimmer 8 and a secondary-side circuit that supplies current to LED strings LEDA,LEDB.

A primary side controller integrated circuit (IC) 20 operates a switching transistor N1, which is illustrated as external to primary side controller IC 20, but that alternatively may be included within primary side controller IC 20. Primary-side controller IC 20 includes a pulse-width modulator, or other suitable controller capable of controlling the amount of energy applied to the primary winding of transformer T1, by the activation of switching transistor N1, according to dimming values that are determined from detecting a dimming level of triac-based dimmer 8 from a waveshape of power supply voltage $+V_S$, which is generated from the input AC voltage supplied from triac-based dimmer 8 by a bridge rectifier BR and a filter capacitor C1. Replacement lighting device 10 also includes a secondary-side switching power converter 28 that controls the current supplied to each of LED strings LEDA,LEDB, and includes a dump circuit 32 that dissipates any excess energy transferred from the primary side of transformer T1. A control integrated circuit 30 operates secondary-side switching power converter 28.

Figure 2:
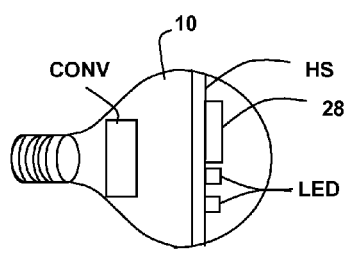
FIG. 2 is a pictorial diagram depicting a physical configuration of lighting device 10.

Referring additionally to FIG. 2, a pictorial diagram of replacement lighting device 10 is shown. A converter circuit CONV includes bridge rectifier BR, primary-side controller IC 20, capacitor C1, transistor N1, transformer T1, and any other components required for the primary-side circuit. A heatsink HS is included within replacement lighting device 10 to dissipate heat generated by LED strings LEDA,LEDB, and is also used to mount LED strings LEDA,LEDB and switching power converter 28, as well as dissipate heat generated by switching power converter 28. Placing the control of current supplied to LED strings LEDA,LEDB on the secondary side of transformer T1 can allow for lower-voltage transistors and capacitors and higher frequency switching (which reduces inductor and capacitor sizes), reducing the cost of supplying and controlling current to multiple LED strings. Further, since both heatsink HS and dump circuit 32 are on the isolated secondary side of transformer T1, heatsink HS can be used to dissipate heat generated by dump circuit 32.

Figure 3:
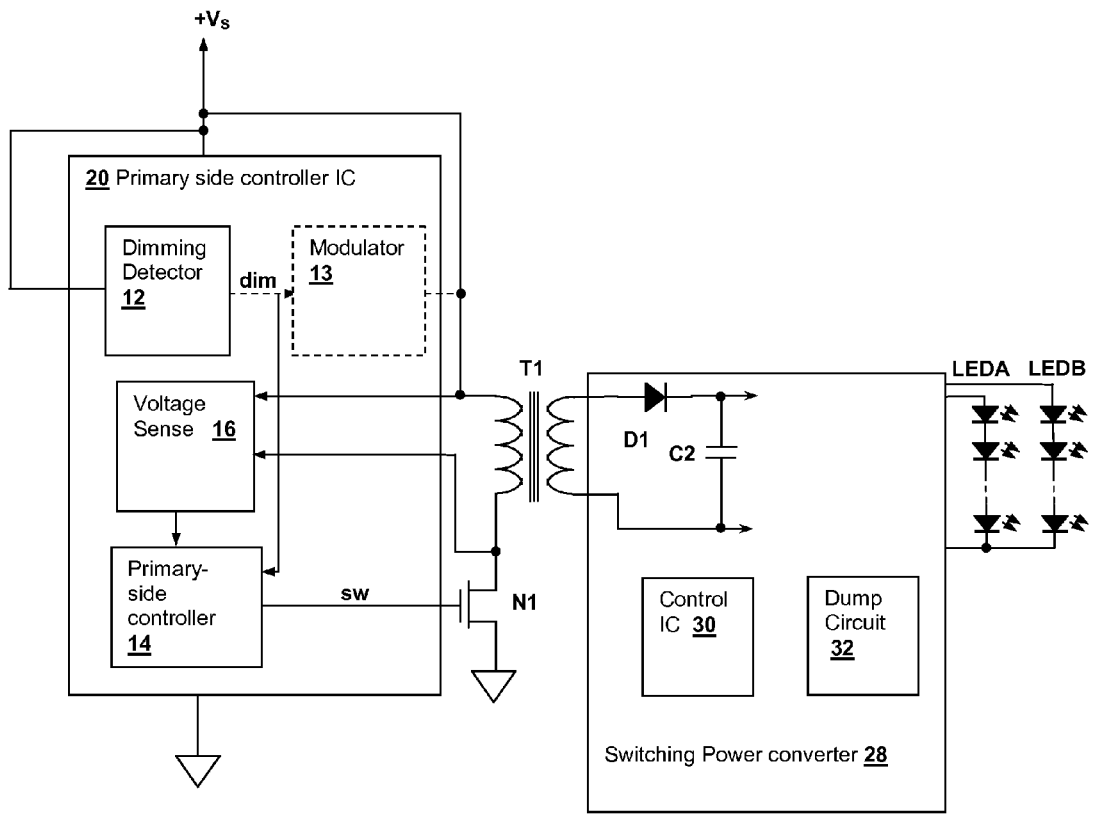
FIG. 3 is a simplified schematic diagram depicting details within lighting device 10.

Referring now to FIG. 3, details of primary side controller IC 20 are shown, in accordance with an example described below. A dimming detector 12 detects a dimming value of triac-based dimmer 8 from the waveshape of power supply voltage $+V_S$, which may be performed according to the techniques described in above-incorporated U.S. Patent Application "DUTY FACTOR PROBING OF A TRIAC-BASED DIMMER", Ser. No. 13/287,257. The dimming value is communicated through transformer T1 either by the pattern, frequency and/or timing of switching pulses corresponding to activations of switching transistor N1, or by additional signals injected by a modulator 13 during intervals when switching transistor N1 is off, e.g., after all of the required energy has been transferred for a given cycle of the input AC waveform. A voltage sensing circuit 16 senses the voltage across the primary winding of transformer T1, which, when transistor N1 is off and diode D1 is forward biased, indicates the voltage across capacitor C2. Having an indication of the voltage across capacitor C2 from the primary winding of transformer T1 permits primary side controller IC 20 to regulate the voltage across capacitor C2 without an additional isolated feedback path. The indicated voltage across capacitor C2 is used to control the switching of primary-side controller 14, which in the example is a pulse width modulator. Thus, primary side controller IC 20 can be a relatively simple circuit with a low pin-count, as the task of controlling the current supplied to LED strings LEDA,LEDB is delegated to secondary-side switching power converter 28.

Figure 4:
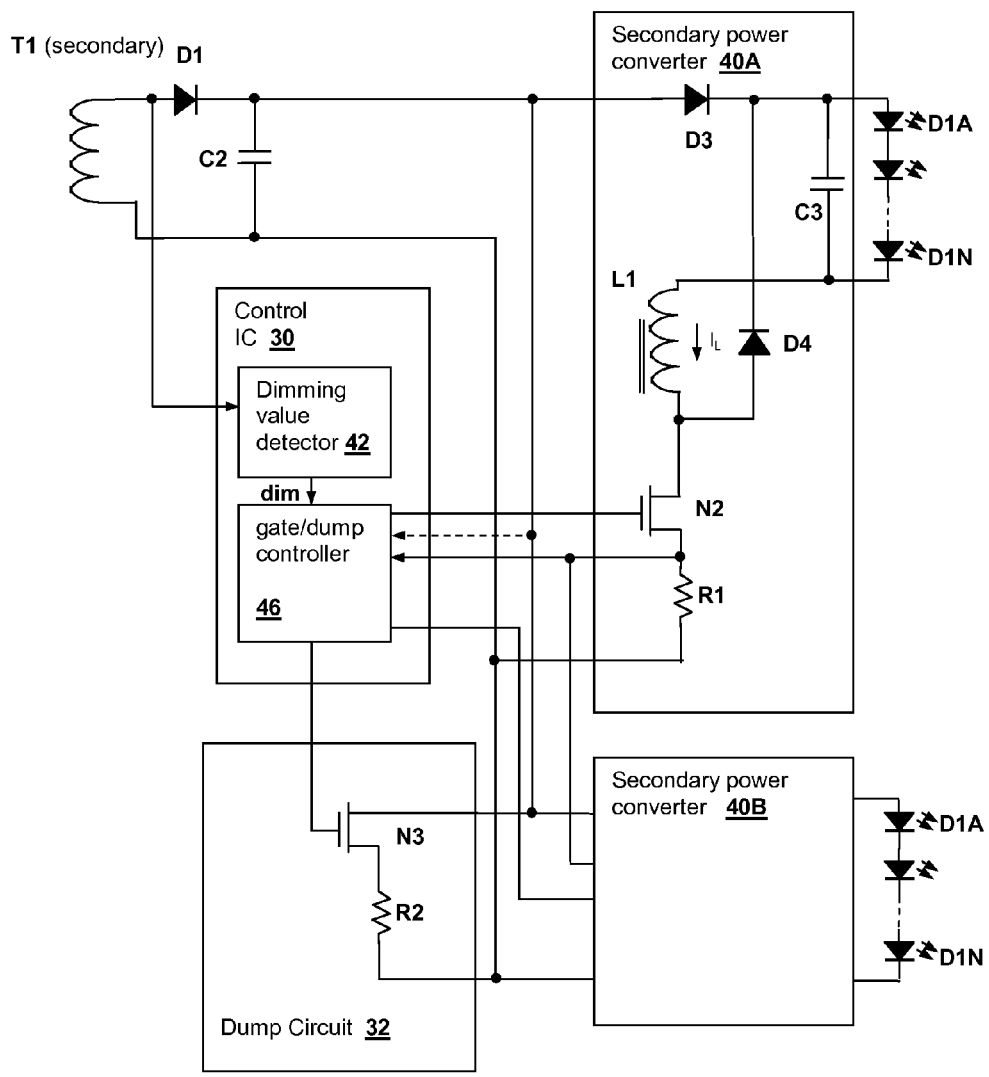
FIG. 4 is a simplified schematic diagram depicting other details within lighting device 10.

Referring now to FIG. 4, details of secondary side switching power converter 28 are shown. A separate secondary-side power converter circuit 40A, 40B draws energy from capacitor C2, and supplies a current to the corresponding one of LED strings LEDA,LEDB according to the current dimming value. Separate control of current is necessary since the amount of current required for a given brightness differs between LED types (LED colors) and the amount of brightness needed to adequately simulate the dimming of an incandescent bulb varies separately for the different LED strings LEDA,LEDB. For example, at lower illumination levels, the red portion of the spectrum dominates as the illumination intensity is decreased.

Each of secondary-side power converter circuits 40A,40B include a switching transistor N2, a current sensing resistor R1 an inductor L1, a flyback diode D4 and another diode D3 that prevents back-conduction into capacitor C2 and the other circuits coupled to capacitor C2. A storage capacitor C3 is provided across the corresponding LED string LEDA,LEDB to prevent any visible light variation due to switching. The depicted secondary power converters 40A,40B are inverted buck configurations, in which current $I_L$ is drawn through the corresponding LED string LEDA,LEDB when transistor N2 is activated by secondary side control IC 30 and when transistor N2 is de-activated by secondary side control IC 30, the energy stored in inductor L1 is dumped into capacitor C3 through flyback diode D4. Dump circuit 32 includes a switching transistor N3 and a resistor R2 that are used to dissipate any excess energy present on capacitor C2, when gate/dump controller 46 determines that the voltage on capacitor C2 has risen too high, or directly according to the dimming value, which is detected from the secondary winding of transformer T1 by a dimming value detector 42.

Dimming value detector 42 of secondary-side controller IC 30 and primary side controller 14 (or optionally modulator 13) of primary-side controller IC 20, act in concert to communicate the dimming value from dimming detector 12 of primary-side controller IC 20 to gate/dump controller 46 of secondary-side controller IC 30. There are numerous signaling techniques available for communicating information through a switched power isolation transformer, some of which are illustrated in U.S. Pat. Nos. 7,656,687, 7,804,697 and 7,796,076, the disclosures of which are incorporated herein by reference. In the present disclosure, the techniques are grouped in two categories: signaling using the power-transferring switching pulses to convey the dimming information and signaling using an additional signal that conveys the dimming information.

Figure 5:
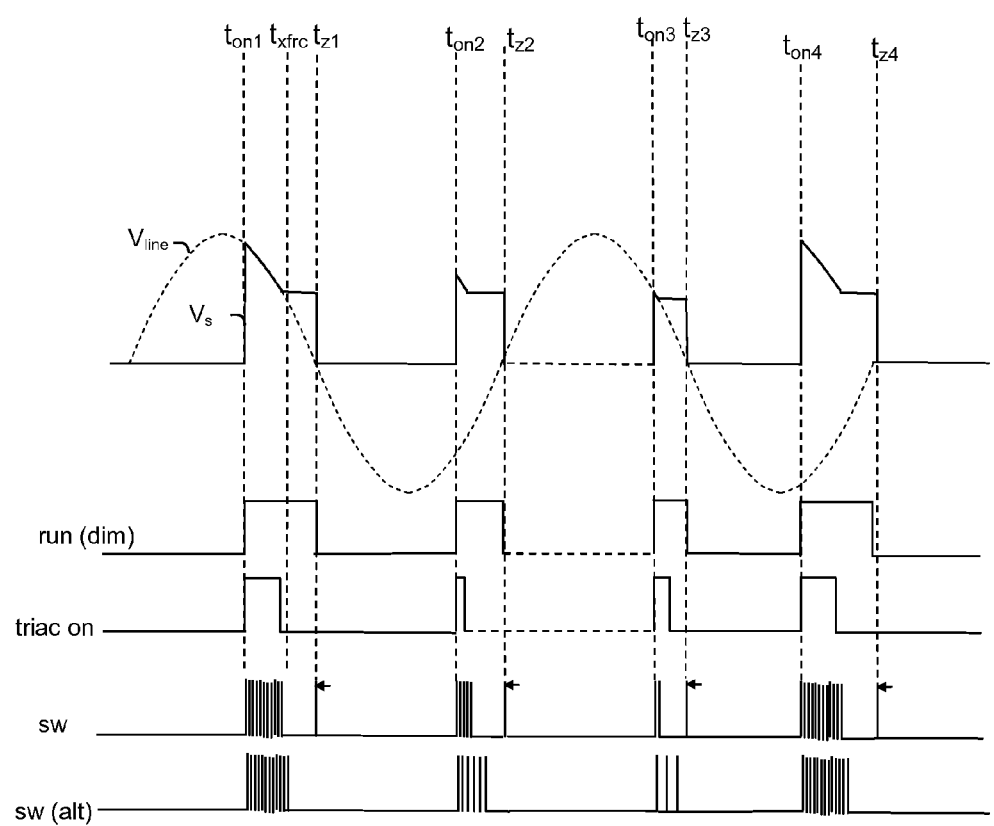
FIG. 5 is a signal waveform diagram illustrating signals within lighting device 10.

Referring now to FIG. 5, examples of the first category of dimming communication techniques are illustrated in accordance with different examples. AC line voltage $V_{line}$ is illustrated along with the cut sine waveforms of rectified dimmer output forming power supply voltage $V_S$. The triac in triac-based dimmer 8 turns on at time $t_{on1}$, which represents the beginning of available energy transfer, the duration of which is indicated by signal run, which terminates at the zero-crossing of AC line voltage $V_{line}$, and which also indicates the dimming value directly. The triac in triac-based dimmer 8 turns off whenever the current falls below the hold current of the triac, i.e., at times $t_{z1}$, $t_{z2}$, $t_{z3}$, and $t_{z4}$. Signal triac on shows the on-time of the triac. Since one goal of the dimming communication techniques of the circuits illustrated herein is to communicate the dimming value indicated by the width of signal run, one way to provide the indication is to always start the operation of primary-side controller 14 of FIG. 3 when signal run is asserted (at times $t_{on1}$, $t_{on2}$, $t_{on3}$ and $t_{on4}$) and to always assert (or terminate) a final pulse at a time when signal run is de-asserted. The final pulses are located at times $t_{z1}$, $t_{z2}$, $t_{z3}$, and $t_{z4}$, even though energy transfer is substantially complete earlier, e.g., at time $t_{xfc}$ in the first illustrated cycle. The above type of signaling in illustrated by control signal sw, in accordance with one example. In accordance with another example, the frequency of pulses in control signal sw(alt) is modulated to reflect the dimming value. In both of the above examples, dimming value detector 42 of FIG. 4 is adapted to measure the time interval between the beginning and final pulse of the pulse burst for the example of control signal sw, or the frequency of leading edges of the pulses in control signal sw(alt). In accordance with another example, the dimming value can be encoded in patterns within control signal sw.

Figure 6:
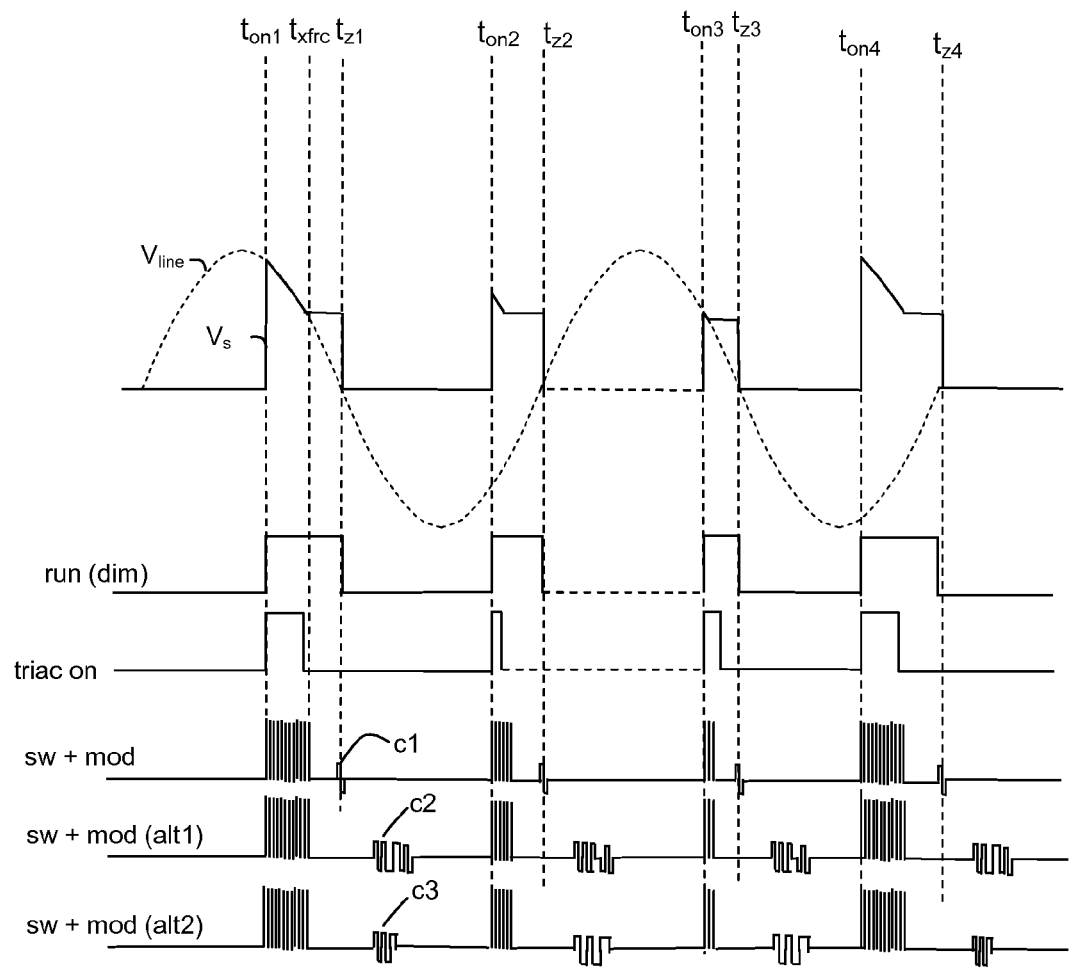
FIG. 6 is a signal waveform diagram illustrating signals within lighting device 10.

Referring now to FIG. 6, examples of the second category of dimming communication techniques are illustrated. The illustrated waveforms are the same as those illustrated in FIG.

5, with the exception of control signal sw, so only the additional signals in FIG. 6 will be described below. Signal sw+mod illustrates a control signal in accordance with one example, in which a particular low-amplitude code pattern c1 is embedded in control signal sw+mod by modulator 13 of FIG. 2 to indicate zero-crossing times $t_{z1}$, $t_{z2}$, $t_{z3}$, and $t_{z4}$. Dimming value detector 42 of FIG. 4 is adapted to detect code pattern c1, which is illustrated as a low-amplitude bi-polar pulse, but may be any detectable code pattern. Other examples are illustrated by control signal sw+mod(alt1), which illustrates insertion of a code pattern c2 that forms a binary code directly encoding dimming value dim, which can be detected by a suitable decoder within dimming value detector 42 of FIG. 4. Finally control signal sw+mod(alt2) illustrates insertion of a burst c3, the frequency of which indicates dimming value dim which can be detected by a suitable frequency detector within dimming value detector 42 of FIG. 4.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. An integrated circuit for supplying current to one or more light-emitting diodes (LEDs), comprising:
    an input circuit for coupling to a secondary winding of an external transformer that isolates the integrated circuit and the LEDs from a primary-side circuit that provides pulses through the transformer for supplying energy to the LEDs;
    a decoder coupled to the input circuit for decoding a dimming value encoded in a voltage waveform provided across the secondary winding; and
    a power converter control circuit for controlling a current supplied to the LEDs in conformity with the dimming value.

2. The integrated circuit of claim 1, wherein the voltage waveform is a primary-side power converter waveform comprising the pulses, and wherein the dimming value is encoded in the position of the pulses in time.

3. The integrated circuit of claim 2, wherein a time period between a beginning pulse and an ending pulse of a cycle of the primary-side power converter waveform indicates an active period of a dimmer circuit supplying an AC line input to a circuit that generates the primary-side power converter waveform.

4. The integrated circuit of claim 2, wherein a frequency of at least a portion of the primary-side power converter waveform encodes the dimming value.

5. The integrated circuit of claim 2, wherein the dimming value is encoded in a pattern of pulses in a cycle of the primary-side power converter switching waveform.

6. The integrated circuit of claim 1, wherein the voltage waveform is a primary-side power converter waveform comprising pulses for supplying energy to the LEDs and an additional component bearing the encoded dimming value.

7. The integrated circuit of claim 6, wherein the additional component comprises pulses having a peak voltage substantially lower than a peak voltage of the pulses for supplying energy to the LEDs.

8. The integrated circuit of claim 1, further comprising a control circuit for operating a controllable load that draws a load current from the secondary winding to maintain a minimum average load current at the secondary winding that exceeds the current required to supply the LEDs for a given dimming value.

9. An integrated circuit for supplying current to one or more light-emitting diodes (LEDs), comprising:
    an input circuit for coupling to a source of AC line voltage having a characteristic waveform that differs from sinusoidal by action of a thyristor-based dimmer circuit;
    a dimming detector for determining a dimming value from the characteristic waveform of the AC line voltage;
    a power converter control circuit for controlling a switch coupled to a primary winding of an external transformer that supplies energy to the one or more LEDs via pulses of a primary-side power converter waveform, wherein the one or more LEDs are coupled to a secondary winding of the external transformer and are isolated from the integrated circuit; and
    an encoding circuit that encodes the dimming value at the primary winding of the external transformer.

10. The integrated circuit of claim 9, wherein the dimming value is encoded in the position of the pulses in time.

11. The integrated circuit of claim 10, wherein a time period between a beginning pulse and an ending pulse of a cycle of the primary-side power converter waveform indicates an active period of the dimmer circuit.

12. The integrated circuit of claim 9, wherein a frequency of at least a portion of the primary-side power converter waveform encodes the dimming value.

13. The integrated circuit of claim 9, wherein the dimming value is encoded in a pattern of pulses in a cycle of the primary-side power converter waveform.

14. The integrated circuit of claim 9, wherein the voltage waveform is a primary-side power converter waveform comprising pulses for supplying energy to the LEDs and an additional component bearing the encoded dimming value.

15. The integrated circuit of claim 14, wherein the additional component comprises pulses having a peak voltage substantially lower than a peak voltage of the pulses for supplying energy to the LEDs.

16. A lighting device having one or more light-emitting diodes (LEDs), comprising:
    a dimming detector for generating a dimming value from a shape of a waveform of an input source of AC line voltage;
    a first power converter for supplying pulses to the primary winding of a transformer and further information indicative of the dimming value forming a primary-side power converter waveform;
    a rectifier circuit for generating a DC voltage from a voltage across an isolated secondary winding of the transformer, wherein the rectifier circuit comprises a capacitor for storing energy transferred through the transformer by the pulses;
    a detector for detecting the further information indicative of the dimming value from a voltage waveform across the secondary winding of the transformer and determining a detected dimming value; and
    a second power converter having an input coupled to the capacitor for supplying energy to the one or more light-emitting diodes from the capacitor, wherein at least one current supplied to the one or more light-emitting diodes is controlled in conformity with the detected dimming value.

17. The lighting device of claim 16, wherein the further information indicative of the dimming value is encoded in the position of the pulses in time.

18. The lighting device of claim 17, wherein a time period between a beginning pulse and an ending pulse of a cycle of the primary-side power converter waveform indicates an active period of a dimmer circuit supplying an AC line input to the first power converter circuit.

19. The lighting device of claim 16, wherein a frequency of at least a portion of the primary-side power converter waveform encodes the dimming value.

20. The lighting device of claim 16, wherein the dimming value is encoded in a pattern of pulses in a cycle of the primary-side power converter waveform.

21. The lighting device of claim 16, wherein the voltage waveform is a primary-side power converter waveform comprising pulses for supplying energy to the LEDs and an additional component bearing the encoded dimming value.

22. The lighting device of claim 21, wherein the additional component comprises pulses having a peak voltage substantially lower than a peak voltage of the pulses for supplying energy to the LEDs.

23. The lighting device of claim 16, further comprising a controllable load that draws a load current from the secondary winding to maintain a minimum average load current at the secondary winding that exceeds the current required to supply the one or more light-emitting diodes for a given dimming value.

24. A method of supplying energy to one or more light-emitting diodes (LEDs), the method comprising:
    generating a dimming value from a shape of a waveform of an input source of AC line voltage;
    supplying pulses to the primary winding of a transformer and further information indicative of the dimming value forming a primary-side power converter waveform;
    generating a DC voltage from a voltage across a secondary winding of the transformer, and storing energy in a capacitor by charging the capacitor from the DC voltage;
    detecting the further information indicative of the dimming value and determining a detected dimming value from a voltage waveform across the secondary winding of the transformer; and
    supplying energy to the one or more light-emitting diodes from the capacitor, wherein at least one current supplied to the one or more light-emitting diodes is controlled in conformity with the detected dimming value.

25. The method of claim 24, wherein the further information indicative of the dimming value is encoded in the position of the pulses in time.

26. The method of claim 24, wherein a time period between a beginning pulse and an ending pulse of a cycle of the primary-side power converter waveform indicates an active period of a dimmer circuit supplying an AC line input to a circuit that generates the primary-side power converter waveform.

27. The method of claim 24, wherein a frequency of at least a portion of the primary-side power converter waveform encodes the dimming value.

28. The method of claim 24, wherein the dimming value is encoded in a pattern of pulses in a cycle of the primary-side power converter waveform.

29. The method of claim 24, wherein the voltage waveform is a primary-side power converter waveform comprising pulses for supplying energy to the LEDs and an additional component bearing the encoded dimming value.

30. The method of claim 29, wherein the additional component comprises pulses having a peak voltage substantially lower than a peak voltage of the pulses for supplying energy to the LEDs.

31. The method of claim 24, further comprising dissipating excess energy transferred to the capacitor using a controllable load that draws a load current from the secondary winding to maintain a minimum average load current at the secondary winding that exceeds the current required to supply the one or more light-emitting diodes for a given dimming value.

* * * * *